United States Patent Office 3,298,865
Patented Jan. 17, 1967

3,298,865
CRUDE SUGAR LIQUOR DEFECATION PROCESS
Harold Eli Bode, 308 Schofield Bldg.,
Cleveland, Ohio 44115
No Drawing. Filed Apr. 18, 1966, Ser. No. 543,072
7 Claims. (Cl. 127—41)

This invention relates to novel procedures for precipitating or removing colloidally suspended materials from crude sugar liquors; and is a continuation-in-part of my allowed U.S. patent application Serial No. 286,178, which was filed on June 7, 1963, now U.S. Patent No. 3,248,225. The latter is a continuation-in-part of my U.S. Patent 3,093,504, filed April 28, 1960, under Serial No. 25,481.

In the allowed parent patent application, procedures for bringing about a substantially complete precipitation of a starch gel are described. In the present patent application specific procedures are disclosed for the novel exploitation of this starch paste precipitation phenomena in the refining of crude sugar liquors.

One object of this invention is to provide starch paste precipitating conditions which enable the simultaneous precipitation or coagulation of dispersed or colloidally suspended non-sugar materials in crude sugar liquors.

Another object of this invention is to provide a starch paste or solution precipitating procedure which enables, in the presence of suspended non-sugar particles of crude sugar liquors, the simultaneous production of an insoluble metal starch derivative capable of simultaneously functioning as an animal feed material.

Still another object of the invention is to exploit the starch paste precipitating phenomenon of phosphated starch as a means for removing substantial amounts of either dissolved or colloidally suspended non-sugar ingredients in crude sugar liquors; such as proteins, amino acids, waxes, soluble alkaline earth metal derivatives, and fibrous materials.

Another object of the invention is to exploit the phosphated starch reaction to produce a direct refined sugar from sugar cane juice; said direct sugar being of sufficient purity be capable of matching many qualities of refined sugar produced by the further refining of raw cane sugar.

The important advantages of phosphated starch pastes in crude sugar liquor refining are the ability to obtain a substantially complete starch precipitation, the easy settling or decanting of the resulting metal starch derivative, and the ability of the coagulating or precipitated starch paste to bring down with it the suspended non-sugar solids, as well as certain sugar liquor non-sugar solubles. For the efficient functioning of the process of this invention in crude sugar refining, it is necessary that a phosphated starch and a starch paste precipitating metal soluble metal compound be used which result in the rapid formation of a granular, easy settling metal starch compound. It is also necessary to use a soluble metal compound which is either non-toxic or which, after its reaction with a phosphated starch paste to produce a metal derivative of phosphated starch, can be subsequently completely removed. The oxide or hydroxide of calcium is an example of a suitable edible metal compound sugar liquor defecating agent; and the oxide or hydroxide of barium is an example of a toxic metal compound which can be subsequently removed from the crude sugar liquor by precipitation in the form of a completely insoluble metal salt such as barium sulfate. The use of barium hydroxide or oxide in conjunction with phosphated starch crude sugar liquor defecation is particularly suitable in the Stefens refining procedure wherein present commercial practice frequently uses barium hydroxide for the defecation of certain beet sugar molasses fractions.

Numerous attempts have been made in the past to produce starch pastes capable of substantially complete precipitation out of a water solution. In the prior art, such attempts have almost invariably led to incomplete precipitation of the starch dry substance from the aqueous starch gel. It is known, that a starch paste can be more or less completely precipitated by the addition of certain organic solvents such as the lower aliphatic alcohols. Such procedures are, however, impractical from a commercial standpoint because it introduces volatile organic liquids which are expensive to recover after the starch has been precipitated.

Attempts have also been made to precipitate a starch paste by means of the formation of metal derivatives of starch, particularly barium starch. Such procedures are also costly and inefficient. This is because the starch granules must first be thoroughly gelatinized by means of an excess of caustic soda. The resulting viscous strongly alkaline starch paste can then be partially precipitated by addition of water soluble salts of cations, such as barium chloride. This results in the production of an insoluble precipitate of a barium derivative starch fraction. However, this precipitation is far from complete. Only a fraction of the total starch in the caustic starch paste ends up as an insoluble barium starch fraction. The remainder shows up as barium derivatives of various starch fractions having different degrees of solubility.

The recent commercial advent of phosphate-modified starches known as starch phosphates, have made possible, for the first time, a new type of starch functioning tool. The phosphated starches make possible the practical exploitation of the concept of substantially complete precipitation of an aqueous starch gel, simultaneously with the production of metal starch derivatives having valuable physical or chemical properties.

It is known that starch pastes are capable of suspending, dispersing, or occluding finely divided organic or inorganic materials. In accordance with this invention, it has been found that, if a starch phosphate paste containing other suspended particles therein has the paste gel broken by means of starch precipitation in the form of a metal starch derivative, this gel breaking and precipitating action enables a concomitant coagulation or settling of suspended non-starch finely comminuted materials.

Phosphated starch, also sometimes designated as orthophosphate esters of starch, can be readily prepared when starch is reacted with certain orthophosphate salts in accordance with certain prescribed procedures. This phosphated starch can be modified to either a simple or a cross-linked phosphate ester stage. The resulting phosphated starch can, if desired, be separated into phosphated starch fractions whose viscosity is radically higher than the whole non-fractionated starch portion.

For the purposes of this invention, phosphated starches having a bound phosphorus content of between 0.5 and 5.0 percent could be used. In general, these phosphated starches are prepared by heating a starch containing about 10 percent moisture in the presence of the sodium salts of orthophosphoric acid, at a temperature of between 120 and about 175° C. for a period of about 0.25 to 12 hours. Phosphated starches suitable for this invention, containing various amounts of bound phosphorous and having various degrees of cross-linking are described in the Louis W. Ferrara U.S. Patent 2,865,763; the Ralph W. Kerr U.S. Patent 2,884,413; and the Hans Neukom U.S. Patent 2,884,412. Other prior art teaches various means for producing phosphated starches of low or high viscosities.

For many purposes, a phosphated starch containing about 2.0 percent of bound phosphorus will function satisfactorily from a starch paste precipitation as well as from a metal starch derivative formation standpoint. However, the particular degree of starch phosphation, as well as the particular metal starchate derivative which is formed during the precipitation of the phosphated starch paste will depend upon the particular end-use for which the phosphated starch is intended. This is because the physical properties of the resulting precipitated metal starch derivatives will vary with the kind of metal, as well as with the degree of phosphate ester formation.

Numerous varieties of starch, such as corn, milo, wheat, tapioca, rice, waxy maize, and potato starches may be used to prepare suitable starch phosphates. Starch fractions or crude amylaceous materials may also be used for phosphating the carbohydrate. Examples are amylose, dextrins, roll gelatinized cold water soluble starches, finely comminuted degerminated corn meal, and dry milling refined wheat flour which has had a major portion of its protein and fiber removed by mechanical means, such as certain air aspiration procedures.

One example of a starch phosphate which is suitable for many uses specified in this invention is a starch product known as ARD–1230, sold by The American Maize Products Company.

Other examples of phosphated starches which could be used are the phosphated waxy maize, wheat starch, and degerminated corn meal products described in my copending allowed U.S. patent application Serial No. 286,178, filed June 7, 1963, now U.S. Patent No. 3,248,225. In the case of degerminated corn meal, it is preferable to first remove the water solubles and dehydrate, before subjecting this crude starch to a phosphating treatment.

I have found that the application of a lime precipitation of a phosphated starch gel to crude sugar liquor refining can result in numerous novel beneficial effects. It has been found that the presence of even small proportions of phosphated starch paste in crude sugar liquors can cause the removal of non-sugar impurities in greater amount or with greater efficiency than that which takes place with present crude sugar liquor refining procedures.

In the case of crude sugar cane juice which is usually subjected to straining with stationary and vibrating screens, it has been found that the addition of phosphated starch to such a liquor can cause the coagulation and precipitation of suspended bagasse, bagacillo, and other suspended matter. The resulting coagulate or precipitate is in a physical form which enables it to be removed by settling or decantation procedure; thereby eliminating the stationary and vibrating screens. In accordance with the process of this invention, the creation of a phosphated starch paste gel within a crude sugar cane juice will produce upon the addition of a sufficient amount of lime to cause the breaking of the said starch paste gel and the formation of the stoichiometric equivalent of the calcium salt of phosphated starch, a novel and advantageous defecation. The resulting insoluble calcium derivative of phosphated starch has excellent settling or decanting properties as well as the ability of carrying down with it other suspended matter such as bagacillo; precipitates of certain cane juice solubles such as nitrogen compounds and mineral salts, as well as some waxy material.

Upon settling or decanting the above precipitate mixture of calcium salt of phosphated starch blended with sugar cane juice insolubles as well as some non-sugar precipitated soluble ingredients, this material, upon dehydration, becomes an excellent animal feed material. This dried feed material is valuable not only because of its nutritional calcium and protein content, but also because of the presence of a large proportion of starch which acts as a nutritional carrying agent and diluent for the fiber constituents emanating from the bagasse.

Phosphated starch pastes can also be profitably exploited when added during or after the defecation treatments commonly applied in the production of raw cane sugar. Thus, cane mill juice is usually subjected to a straining and screening operation, followed by a lime defecation. It has been found that, in the presence of phosphated starch paste, the heating of the lime-treated crude sugar liquor to obtain efficient coagulation and precipitation of the non-sugar impurities can be carried out at a substantially lower temperature than that which is necessary when no phosphated starch paste is present. Thus, most crude sugar liquors, after the lime addition, are heated to temperatures above 210° F., or to a boiling temperature. These high temperatures bring about an unavoidable introduction of color as well as some destruction of sugar. In the presence of phosphated starch paste, the defecation temperature can range between 160 and 180 ° F. and the resulting non-sugar precipitates will nevertheless be in a clarifiable or filtered form.

The use of phosphated starch paste also enables one to carry out the liming or lime defecation at a considerably lower alkaline pH than that which is used in many crude sugar liquor refining processes. Thus, a pH of 7.0 to 7.2 will suffice, even in the case of sugar juices wherein, without the phosphated starch, it is necessary to resort to as high as 8.0 pH for proper clarification. When a defecated sugar liquor going to the crystallizing vacuum pan has a pH higher than about 7.2, the boiling time in the pan for sugar crystallization is prolonged and may be increased by as much as 20 percent. By using my phosphated starch defecation procedure the need for going beyond 7.2 pH is eliminated.

Since the amount of lime used for defecation is many times that required for the reaction of the lime with phosphated starch to produce a precipitate of the calcium salt of phosphated starch, the cost of the phosphated starch precipitation does not involve the introduction of an additional reagent cost for precipitating the phosphated starch paste.

Another advantage of the exploitation of phosphated starch in crude sugar refining is the fact that, when applied to cold screened crude cane juice liquors, losses from inversion caused by the acid pH of these crude cane juices are decreased, with the simultaneous production of a coagulate precipitate having an economic value in animal feeding.

The amount of phosphated starch that will be necessary to produce a starch paste having sufficient crude sugar liquor defecation effects will depend upon the particular nature of the sugar liquor being treated. In addition to this, the higher the Brix of the sugar liquor, the less will be the amount of the phosphated starch necessary, based upon sugar dry substance. In general, beneficial effects with phosphated starch can be obtained when using as little as 0.1 percent of starch based upon the water content of the sugar liquor.

*Example 1.—Precipitation of starch phosphate by adding lime*

A dilute paste of a phosphated waxy maize starch having a bound phosphorous content of 2.0 percent and containing 0.3 part of starch phosphate per 100 parts, was treated with 1.0 part of lime and vigorously agitated for 10 minutes. There resulted an insoluble flock of calcium starch phosphate that settled quickly and was readily centrifugable. An analysis of the clear filtrate showed that 88 percent of the starch phosphate had been precipitated by the lime.

*Example 2—Precipitation of starch phosphate by adding barium hydroxide*

A dilute starch paste containing 0.3 part of a phosphated wheat starch having a bound phosphorus content of 1.8 percent per 100 parts of paste, was reacted with 0.5 part of barium hydroxide. After ten minutes of mixing, an insoluble flock of barium starch phosphate formed, which rapidly settled to the bottom of the container, leaving a clear, colorless supernatant liquid. An analysis of the clear filtrate showed that 85 percent of the starch phosphate had been precipitated by the barium hydroxide.

In the presence of sugar solids, the degree of starch phosphate precipitation during a lime or barytes defacation treatment of crude sugar liquors is substantially qualitatve.

*Example 3.—Removal of bagacillo and other non-sugar ingredients from strained mill juce*

One hundred parts by weght of a 16 Brix strained mill juice containing 0.3 part of bagacillo and other suspended matter was mixed with 0.2 part of a phosphated starch containing 2.0 percent of bound phosphorus, and the liquor heated to 170° F. The resulting blend of phosphated paste and crude sugar liquor was then treated with a sufficient amount of lime to adjust the pH of the acidic cane juice to 7.1 pH.

A rapid, decantable precipitate formed which consisted of a mixture of the suspended bagacillo, other organic colloidally dispersed non-sugar ingredients, precipitated nitrogenous compounds, pentosans, and the calcium salt of phosphated starch. The settled precipitate can either be centrifuged or filtered; and the resulting dehydrated wet cake dried to a valuable animal feed product.

*Example 4.—Treatment of a screened sugar cane mill juice*

A 15 Brix screened mill juice was heated to 165° F. and a sufficient amount of a 5 percent phosphated starch paste produced from a corn starch containing 3.2 percent of bound phosphorous was added to result in the presence within the water of the sugar liquor of 0.3 part by weight of phosphated starch. Sufficient lime solution was added to adjust the liquor 7.1 pH, and the batch was heated to 175° F. The presence of the phosphated starch paste in the crude sugar liquor, resulted in a coagulation and clarification action that produced a clarified sugar liquor containing less non-sugar impurities than limed juice. This was accomplished without resorting to the heating of the defecated crude sugar liquor to temperatures at, or above, the boiling point.

*Example 5.—Molasses refining*

A molasses from a raw sugar centrifugal was blended at 170° F. with a phosphated starch sugar paste and limed to 7.1 pH. There resulted a precipitate consisting of non-sugar ingredients as well as the calcium salt of phosphated starch produced from a tapioca starch containing 2.9 percent of bound phosphorous. The remaining molasses liquor, because of its lower non-sugar impurities content, was able to be recirculated in a cane sugar refinery for the further removal of some of its sucrose content.

Similar advantages are obtained when phosphated starch paste is present in beet molasses that is being subjected to lime or barytes defecation.

*Example 6.—Production of invert cane molasses*

A non-screened cane juice liquor was vacuum concentrated to 55 Brix. A crude phosphated starch comprising a water-washed degerminated corn meal whose starch content had been phosphated to a bound phosphorous content of 3.0 percent was added to the cane juice in a sufficient amount to produce a sugar liquor wherein the water in the liquor contained 0.3 percent of phosphated starch. The mixture was heated to 180° F. and sufficient lime added to assure a complete stoichiometric reaction of the phosphated starch paste with calcium. The resulting precipitate consisted of the calcium salt of phosphated starch blended with molasses solubles which had been converted into insolubles. After filtration, the filtrate was then inverted with Invertase enzyme at a suitable invertase pH and the resulting inverted cane molasses liquor was subjected to bone black refining, followed by vacuum concentration in a finishing pan to 42 Bé. The finished product was an invert molasses of higher sugar content, less color, and improved taste. In some cases, it may be necessary to add a small amount of phosphoric acid after the phosphated starch defecation treatment, to assure the complete removal of any soluble calcium compounds.

*Example 7.—Refining of raw sugar*

A batch of raw cane sugar was mixed with a hot, heavy density mingling syrup that is saturated with sucrose. The resulting magma was heated to 135° F. and processed thru a perforated basket sugar centrifugal. The filtrate from the centrifuged sugar was diluted to 63 Brix and blended with a sufficient amount of a phosphated corn starch containing 2.7 percent of bound phosphorous to produce a 0.4 percent starch paste based upon the water in the sugar liquor. A sufficient amount of lime was added to adjust the mixture to 7.2 pH and the batch heated to 175° F. The resulting precipitate comprising calcium starch phosphate having adsorbed within it high molecular non-sugars such as gums, waxes, and polypeptides, was subjected to a Dorr cone centrifugal separation. This produced a clarified sugar liquor containing less non-sugar impurities than that which is obtained when the same 63 Brix liquor was defecated by means of a combination of phosphoric acid and lime sucrate. Because of this improved refining action, it is not necessary to subject the liquor to a bone black treatment. In place of this, for the production of a high quality liquid sugar, the liquor was refined with a powdered vegetable carbon and finally subjected to ion exchange refining. The resulting water white, refined sugar liquor was vacuum concentrated to 67 Brix and used as a base to produce liquid blends of sucrose and dextrose.

For straight sucrose production, the above refined liquor can be either used directly for crystal sugar production; or it can be recirculated to various liquor channels in a sugar refinery producing refined sucrose from raw cane sugar.

*Example 8.—Production of direct sugar from raw cane juice*

A 16 Brix non-screened raw cane mill juice was heated to 130° F. and blended with a sufficient amount of a phosphated starch containing 2.0 percent of bound phosphorous to produce a 0.3 percent phosphated starch paste, based upon the water in the sugar liquor. Sufficient lime solution was added to adjust the liquor to 7.2 pH, and the batch subsequently slowly heated to 175° F. During the heating, the suspended phosphated starch was transformed into a starch paste. As the paste was formed, it reacted with the lime to produce the insoluble calcium salt of phosphated starch. The presence of the phosphated starch paste in the crude sugar liquor during lime defecation resulted in a coagulation and clarification action that produced a clarified sugar liquor containing less non-sugar impurities than screened lime juice.

This was accomplished without resorting to the heating of the defecated crude sugar liquor to temperatures above the boiling point. After decanting the precipitate, the remaining liquor was subjected to a second combined starch phosphate paste and lime defecation treatment under conditions duplicating the first treatment. The resulting defecated sugar liquor was subjected to a Dorr cone centrifuge to remove the resulting precipitate comprising lime neutralized starch phosphate and non-sugar insolubles. The clarified liquor was then subjected to bone black refining, followed by vegetable carbon refining and an ion exchange treatment. This resulted in a final cane mill juice which, when subjected to the usual vacuum pan crystallization procedure used in the production of raw cane sugar, produced a direct sugar of high purity having qualities approaching the qualities of highly refined sucrose produced by cane refineries subjecting raw sugar to a refining treatment consisting of defecation by means of lime and phosphoric acid. In some cases, improved defecating results are obtained if a small amount of phosphoric acid is added in the procedure of the above example; after the phosphated starch paste is reacted with the lime solution to produce a liquor pH of 7.2.

Numerous variations in crude sugar liquor procedures can be used, when applying our phosphated starch paste defecating tool, without departing from the principles of this invention. Thus, in place of screened cane sugar juice, one may beneficially apply the phosphated starch paste precipitating reaction to various crude cane juice liquors coming from the cane mills. Instead of completely blending a phosphated starch with a crude sugar liquor, one may add, incrementally, a phosphated starch paste to a limed crude sugar liquor, and therefore obtain incremental precipitation effects from the resulting precipitated calcium salt of phosphated starch.

The invention is applicable to a wide variety of sugar liquors such as various beet sugar refinery liquors, wood sugar liquors, corn sugar liquors, Hydrol; and various starch or other carbohydrate hydrolyzate liquors. The phosphated starch paste precipitation reaction can also be beneficially applied to crude sugar or polysaccharide liquors obtained during the processing of various fruits or vegetables.

The phosphated starch paste precipitating procedure enables the novel treatment of non-edible suspended or dispersed organic or inorganic materials. One example is the mining industry wherein ores such as iron ore, taconite, bauxite, phosphate rock, and uranium processing liquors can be treated beneficially with phosphated starch pastes. Another example, is in the realm of oil well drilling and other phases of crude oil recovery. The exploitation of the phosphated starch paste precipitating phenomenon in these specific fields is being covered in co-pending U.S. patent application.

While I have illustrated and described a precise arrangement for carrying the invention into effective use, this is capable of many variations and alterations without departing from the spirit of the invention. I therefore do not wish to be limited by the description of this specification, but desire to avail myself of such changes as may fall within the spirit and scope of the appended claims.

What I claim as new, and desire to secure by Letters Patent of the United States, is as follows:

1. A crude sugar liquor defecation process comprising: blending said liquor with a phosphated starch paste, adding sufficient alkaline earth hydroxide defecating reagent to adjust the said sugar liquor to an alkaline pH, heating the resulting liquid mixture; and separating the resulting precipitated blend of an alkaline earth metal derivative of said phosphated starch having adsorbed within it non-sugar solids emanating from said crude sugar liquor.

2. The process of claim 1, wherein the crude sugar liquor is non-screened sugar cane juice.

3. The process of claim 1, wherein the crude sugar liquor is invert molasses.

4. The process of claim 1, wherein the sugar liquor is a molasses washed off of sugar crystals.

5. The process of claim 1, wherein the defecating reagent is selected from the group consisting of the oxides, hydroxides or carbonates of calcium or barium.

6. The process of claim 1, wherein the pH of the alkaline earth hydroxide treated sugar liquor is less than 7.4, and the temperature of the heated, defecated sugar liquor does not exceed 180° F.

7. The process of claim 1, wherein the sucrose in the phosphated starch and alkaline earth hydroxide defecated crude liquor is subsequently inverted.

References Cited by the Examiner

Honig, P.: Principles of Sugar Technology, 1953, Elsevier Publishing Co., New York, pp. 188–191, 340–349 and 508–511.

MORRIS O. WOLK, *Primary Examiner.*

M. E. ROGERS, *Assistant Examiner.*